US009516482B2

United States Patent
Liu et al.

(10) Patent No.: US 9,516,482 B2
(45) Date of Patent: Dec. 6, 2016

(54) CALL REQUEST PROCESSING METHOD AND DEVICE

(71) Applicant: ZTE Corporation, Shenzhen (CN)

(72) Inventors: Shihong Liu, Shenzhen (CN); Yu Zhang, Shenzhen (CN); Tie Tang, Shenzhen (CN); Zhengmiao Yang, Shenzhen (CN); Yongping Shao, Shenzhen (CN); Guolin Ding, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/436,946

(22) PCT Filed: Sep. 23, 2013

(86) PCT No.: PCT/CN2013/084011
§ 371 (c)(1),
(2) Date: Apr. 20, 2015

(87) PCT Pub. No.: WO2014/059857
PCT Pub. Date: Apr. 24, 2014

(65) Prior Publication Data
US 2015/0281926 A1 Oct. 1, 2015

(30) Foreign Application Priority Data
Oct. 18, 2012 (CN) .......................... 2012 1 0398909

(51) Int. Cl.
*H04W 4/16* (2009.01)
*H04B 1/38* (2015.01)
(Continued)

(52) U.S. Cl.
CPC .............. *H04W 4/16* (2013.01); *H04B 1/3816*
(2013.01); *H04M 3/42* (2013.01); *H04W 8/18*
(2013.01); *H04W 8/06* (2013.01); *H04W 88/02*
(2013.01)

(58) Field of Classification Search
CPC ............ H04M 3/42; H04W 4/16; H04W 8/18;
H04W 88/02; H04W 8/06; H04W 4/12;
H04W 36/00; H04W 76/04; H04W 48/16;
H04W 88/06; H04B 1/3816
See application file for complete search history.

(56) References Cited

U.S. PATENT DOCUMENTS 5,764,730 A * 6/1998 Rabe ................. H04M 1/72563
455/403
5,987,325 A * 11/1999 Tayloe ................. H04B 1/3816
379/357.01
(Continued)

FOREIGN PATENT DOCUMENTS

CN 102348179 A 2/2012
CN 102595521 A 7/2012
(Continued)

OTHER PUBLICATIONS

International Search Report for corresponding application PCT/CN2013/084011 filed Sep. 23, 2013; Mail date Dec. 26, 2013.
(Continued)

*Primary Examiner* — Pablo Tran
(74) *Attorney, Agent, or Firm* — Cantor Colburn LLP

(57) ABSTRACT

Provided are a call request processing method and device. The method includes: obtaining state information of a second communication identification card located in a same terminal with a first communication identification card; processing a call request according to the state information, wherein the call request is used for calling the first communication identification card. According to the solution, the technical problem that because only one radio frequency transceiving chip is set in a dual-mode dual-card phone, if
(Continued)

one card is in a communication state, a call to another card is easily lost is solved, thereby reducing call loss.

14 Claims, 5 Drawing Sheets

(51) Int. Cl.
    *H04M 3/42*     (2006.01)
    *H04W 8/18*     (2009.01)
    *H04B 1/3816*     (2015.01)
    *H04W 88/02*     (2009.01)
    *H04W 8/06*     (2009.01)

(56) References Cited

U.S. PATENT DOCUMENTS

| | | | | |
|---|---|---|---|---|
| 8,180,400 B2 * | 5/2012 | Shin | | H04M 1/72519 455/435.2 |
| 8,385,893 B2 * | 2/2013 | Gupta | | H04W 68/02 455/412.2 |
| 8,688,167 B2 * | 4/2014 | Joppek | | H04M 1/24 455/551 |
| 9,121,921 B2 * | 9/2015 | Lee | | G01S 5/02 |
| 2004/0180657 A1 * | 9/2004 | Yaqub | | H04L 63/0853 455/435.1 |
| 2008/0020773 A1 * | 1/2008 | Black | | H04W 8/183 455/445 |
| 2012/0172011 A1 | 7/2012 | Gupta | | |
| 2012/0178500 A1 * | 7/2012 | Hwang | | H04W 8/183 455/558 |

FOREIGN PATENT DOCUMENTS

| | | | | |
|---|---|---|---|---|
| CN | 102711290 A | 10/2012 | | |
| CN | 102833699 A | 12/2012 | | |
| JP | WO 2012017562 A1 * | 2/2012 | | H04M 1/72519 |

OTHER PUBLICATIONS

European Search Report for corresponding application EP 13 84 6531; Report Issued Sep. 8, 2015.

* cited by examiner

CALL REQUEST PROCESSING METHOD AND DEVICE

TECHNICAL FIELD

The disclosure relates to the field of communications, and in particular to a call request processing method and device.

BACKGROUND ART

Nowadays, mobile phones have been more and more widely used with the development of society and the progress of science and technology. The situation has changed from there being only one operator to there being many operators at present, so that the original monopoly has been broken. However, different operators have their own different communication standards.

At present, a widely applied mobile communication standard is a global system for mobile communications (GSM), which is a digital mobile communication standard formulated by the European Telecommunications Standards Institute (ETSI). GSM is short for global system for mobile communications, and an air interface thereof uses a time division multiple access technology. Since being launched into business application from the mid-1990s, the GSM has been used by more than 100 countries around the world. The usage of devices with the GSM standard accounts for more than 80% share in the current global cellular mobile communications device market. The biggest difference between GSM and the previous standards is that signalling and voice channels of GSM are both digital; therefore, GSM is regarded as a second generation (2G) mobile telephone system.

Code division multiple access (CDMA) technology is a new and mature wireless communication technology which is mainly developed on the basis of the spread spectrum communication technology in the digital technology. The principle of the CDMA technology is based on the spread spectrum technology, that is, information data with a certain signal bandwidth and required to be transmitted is modulated with a high-speed pseudo-random code of which the bandwidth is much greater than the signal bandwidth, so that the bandwidth of an original data signal is expanded, and then carrier modulation is performed thereon and the modulated signal is sent out. A receiving end uses a completely identical pseudo-random code to perform correlation processing with the received bandwidth signal, to convert a wideband signal to a narrow-band signal of original information data, that is, despreading, so as to realize data communication.

Wideband code division multiple access (WCDMA) is evolved from code division multiple access (CDMA), and is considered to be a direct expansion of IMT-2000 from the perspective of the official. Compared with generally provided technologies in the existing market, WCDMA can provide a higher data rate for mobile and hand-held wireless devices. WCDMA uses direct sequence-code division multiple access (DS-CDMA) and frequency division duplexing (FDD) modes, wherein the chip rate is 3.84 Mcps, and the carrier bandwidth is 5 MHz. On the basis of Release 99/Release 4 version, 384 kbps user data transmission rate at most can be provided within a 5 MHz bandwidth. WCDMA can support voice, image, data and video communication between mobile/hand-held devices, and the rate can reach 2 Mb/s (for a local area network) or 384 Kb/s (for a wideband network). An input signal is firstly digitized, and then is transmitted in an encoded spread spectrum mode in a relatively wide frequency spectrum range. A narrow-band CDMA uses a carrier frequency of 200 KHz, whereas WCMDA uses a carrier frequency of 5 MHz.

Both the CDMA and the WCDMA use the spread spectrum technology, so that the communication rate of the terminal is greatly improved and is significantly increased compared with the 2G technology, and is thus referred to as a third generation (3G) mobile telephone system.

The above several mainstream standards (including, but being not limited to the above several standards) have their own advantages, and each operators may use one or several mobile communication standards, and communication tariffs thereof are also very different. In order to satisfy the requirements of reducing communication tariffs and realizing the separation of work and life telephones of users, a dual-mode dual-card phone appears.

The dual-mode dual-card phone has two subscriber identity module (SIM) cards, and the two SIM cards may respectively belong to networks with different standards. In order to achieve the purpose of dual-mode dual-card dual-standby, two sets of radio frequency channels are required. At present, the common technical solution is using two radio-frequency chips, respectively a radio-frequency chip 1 and a radio-frequency chip 2, and a switch is adopted to switch to a corresponding network. The specific implementation principle is as shown in FIG. 1. The two SIM cards (SIM_1 and SIM_2) are controlled by the same baseband chip. For a C+G network, there are two radio-frequency chips, and for a W+G network, there is only one radio frequency transceiving chip. The C+G network and the W+G network are both equipped with two sets of transceiving channels. However, there is only one switch used for switching between the networks to communicate (wherein TX is a sent signal, and RX is a received signal). Once a first card in the dual-mode dual-card phone has established a communication, a second card will be in a no service state, which directly results in that a user initiating a communication request to the second card for communication mistakes the mobile phone of the opposite party being in a signal bad state, and the user of the mobile phone will also lose a phone call to the second card during the communication process of the first card. It can be seen from the above-mentioned analysis that, in the related art, since only one radio frequency transceiving chip is arranged in a dual-mode dual-card phone, it would readily result in call loss.

Aiming at the problems above, no effective solution has been presented.

SUMMARY

The embodiments of the disclosure provide a call request processing method and device, so as to at least solve the technical problem in the related art that because only one radio frequency transceiving chip is arranged in a dual-mode dual-card phone, if one card is in a communication state, a call to another card is easily lost.

According to one aspect of the embodiments of the disclosure, a call request processing method is provided, including: obtaining state information about a second communication identification card located in a same terminal with a first communication identification card; and processing a call request according to the state information, wherein the call request is used for calling the first communication identification card.

In an example embodiment, obtaining the state information about the second communication identification card located in the same terminal with the first communication identification card includes: obtaining the state information about the second communication identification card from at least one database for storing the state information.

In an example embodiment, a plurality of networks share one database used for storing state information.

In an example embodiment, before the obtaining of the state information about the second communication identification card located in the same terminal with the first communication identification card, the method further includes: when the terminal is powered on, the terminal sends registration information to mobile switching centres (MSCs) of a plurality of networks to which the plurality of communication identification cards in the terminal belong, wherein the registration information carries indication information for indicating that the plurality of communication identification cards in the terminal are located in a multi-card terminal; and in response to the indication information, the MSCs uploading relevant information about the terminal to the at least one database for storing the state information.

In an example embodiment, the relevant information includes at least of the following: an IMEI number of the terminal, an IMSI number of the terminal and MSISDNs of the plurality of communication identification cards in the terminal.

In an example embodiment, obtaining the state information about the second communication identification card located in the same terminal with the first communication identification card includes: sending a state information obtaining request to at least one database for storing the state information, wherein the state information obtaining request carries an MSISDN of the first communication identification card; and receiving from the at least one database the state information about the second communication identification card corresponding to an MSISDN having an association relationship with the MSISDN of the first communication identification card.

In an example embodiment, after the sending of the state information obtaining request to the at least one database for storing the state information, the method further includes: if the MSISDN of the second communication identification card having the association relationship with the MSISDN of the first communication identification card is not found in the at least one database, according to an IMEI number of the terminal carried in the state information obtaining request, searching for an MSISDN which corresponds to the terminal and is different from the MSISDN of the first communication identification card from the at least one database; and receiving from the data base the state information about the second communication identification card corresponding to the MSISDN which is different from the MSISDN of the first communication identification card.

In an example embodiment, an MSC processing the call request according to the obtained state information about the second communication identification card includes: when the obtained state information about the second communication identification card includes that the second communication identification card is in a communication state, processing the call request according to a pre-determined strategy.

In an example embodiment, the pre-determined strategy includes at least one of the following: after the terminal is hung up, sending the call request to the terminal through a network to which the second communication identification card belongs; sending the call request to the terminal through a network to which the second communication identification card belongs in a manner of a short message; sending the call request to the terminal through a network to which the second communication identification card belongs in a manner of a voice message; transferring the call request to the second communication identification card.

In an example embodiment, obtaining the state information about the second communication identification card located in the same terminal with the first communication identification card includes: receiving the call request; judging whether an MSC of a network to which the first communication identification card belongs does not receive location information about the first communication identification card reported by the first communication identification card within a pre-defined time; if the MSC does not receive the location information within the pre-defined time, the MSC obtaining the state information about the second communication identification card located in the same terminal with the first communication identification card.

According to another aspect of the embodiments of the disclosure, a call request processing device is provided, including: an obtaining unit, which is configured to obtain state information about a second communication identification card located in a same terminal with a first communication identification card; and a processing unit, which is configured to process a call request according to the state information, wherein the call request is used for calling the first communication identification card.

In an example embodiment, the obtaining unit is configured to obtain the state information about the second communication identification card from at least one database for storing the state information.

In the embodiments of the disclosure, after a request for accessing a communication identification card in a terminal is received, if the communication identification card cannot be connected normally, the current state of another communication identification card in the terminal can be obtained, and then a call request can be processed according to the current state of said another communication identification card. By means of the method, the technical problem that because only one radio frequency transceiving chip is arranged in a dual-mode dual-card phone, if one card is in a communication state, a call to the other card is easily lost is effectively solved, and indication information about a card in a communication state in the terminal can be returned, thereby reducing call loss.

BRIEF DESCRIPTION OF THE ACCOMPANYING DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF EMBODIMENTS

The disclosure is described below with reference to the accompanying drawings and embodiments in detail. It should be noted that the embodiments of the present application and the characteristics of the embodiments can be combined with each other if no conflict is caused.

Figure 1:
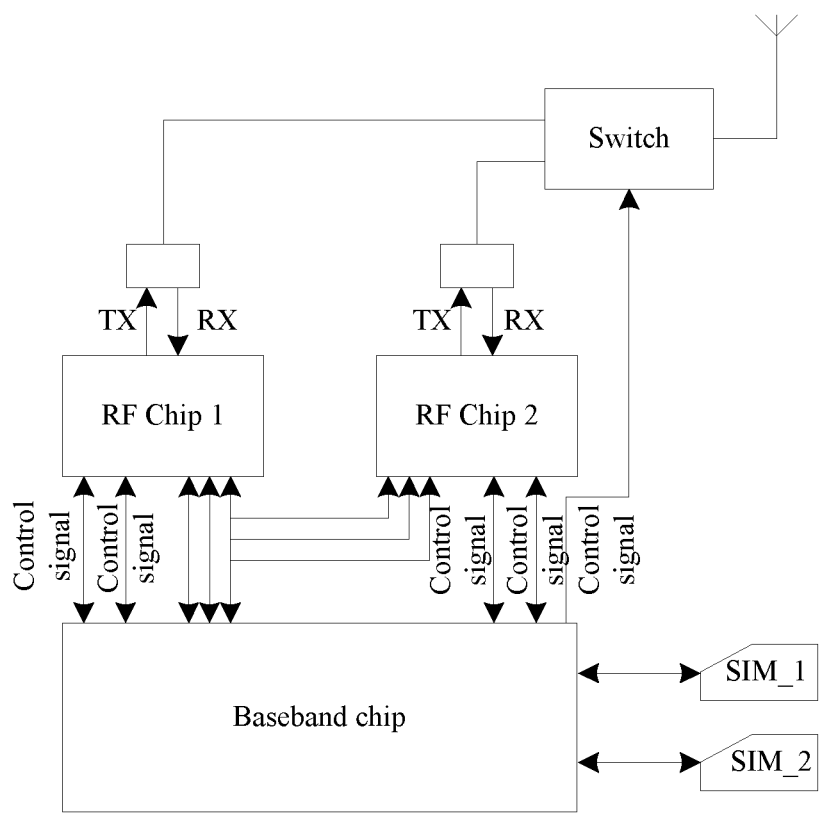
FIG. 1 is schematic block diagram of the basic principle of a dual radio-frequency chip solution dual-card dual-standby mobile phone according to the related art.
Figure 2:
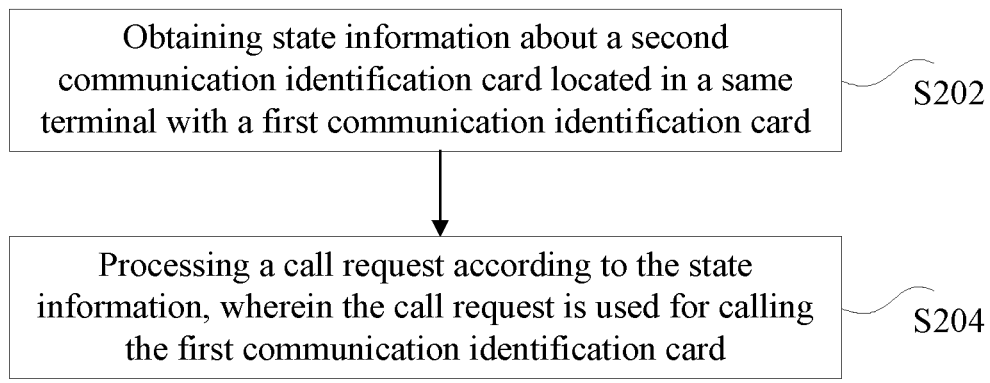
FIG. 2 is an example flowchart of a call request processing method according to an embodiment of the disclosure.

Provided in an example embodiment of the disclosure is a call request processing method. As shown in FIG. 2, the method includes the steps S202 to S204.

In step S202: state information about a second communication identification card located in a same terminal with a first communication identification card is obtained.

In step S204: a call request is processed according to the state information, wherein the call request is used for calling the first communication identification card.

In the example implementations, after a request for accessing a communication identification card in a terminal is received, if the communication identification card cannot be connected normally, the current state of another communication identification card in the terminal can be obtained, and then a call request can be processed according to the current state of said another communication identification card. By means of the method, the technical problem that because only one radio frequency transceiving chip is arranged in a dual-mode dual-card phone, if one card is in a communication state, a call to the other card is easily lost is effectively solved. By means of the method provided in the present embodiment, indication information about a card in a communication state in the terminal can be returned, thereby reducing call loss.

In an example implementation, at least one database may be set to store state information about various communication identification cards in various multi-mode terminals. For example, state information about a second communication identification card may be obtained from at least one database for storing the state information. In an example embodiment, a plurality of networks (i.e. communication standards corresponding to a plurality of operators) share one database for storing state information. Of course, it is also applicable to set one database for each network, and when adoption this manner, it is required to traverse all the databases when obtaining the state information so as to obtain corresponding state information finally.

Figure 3:
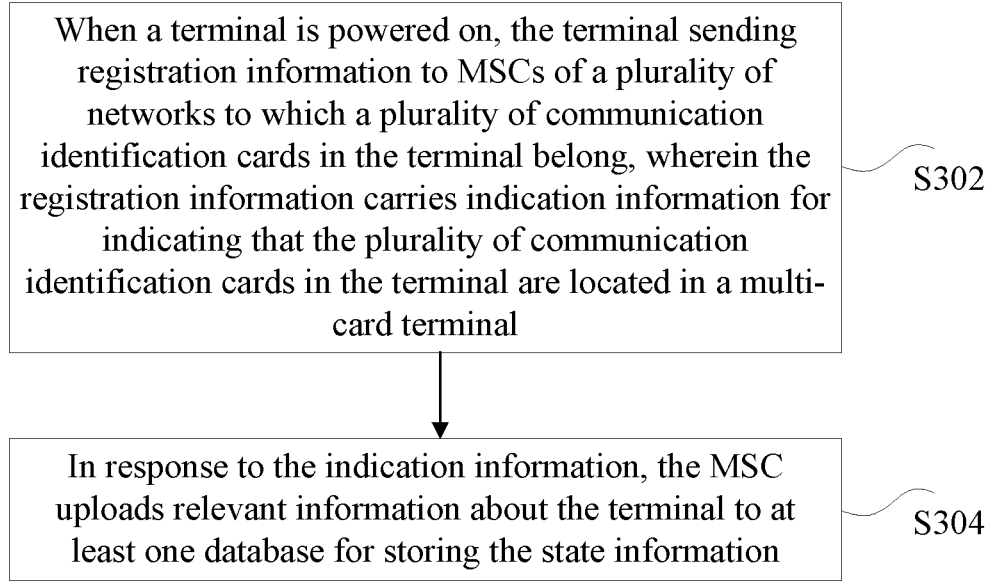
FIG. 3 is another example flowchart of a call request processing method according to an embodiment of the disclosure.

In order to find a corresponding communication identification card in the at least one database, corresponding identification information used for identifying a communication identification card is required to be stored in the at least one database, so as to facilitate finding of the communication identification card. These pieces of information may be reported by a mobile switching centre (MSC) of a network corresponding to the first communication identification card. In an example implementation, as shown in FIG. 3, this procedure may be performed according to the steps S302 to S304.

In step S302: before obtaining the state information about the second communication identification card located in the same terminal with the first communication identification card, when the terminal is powered on, the terminal sends registration information to MSCs of a plurality of networks to which a plurality of communication identification cards in the terminal belong, wherein the registration information carries indication information for indicating that the plurality of communication identification cards in the terminal are located in a multi-card terminal.

In step S304: in response to the indication information, the MSCs upload relevant information about the terminal to at least one database for storing the state information. In an example embodiment, the relevant information may include but is not limited to at least one of the following: an International mobile equipment identity (IMEI) number of the terminal, an International mobile subscriber identification (IMSI) number of the terminal and mobile station ISDN numbers (MSISDNs) of a plurality of communication identification cards in the terminal. The above-mentioned ISDN is an integrated services digital network.

Figure 4:
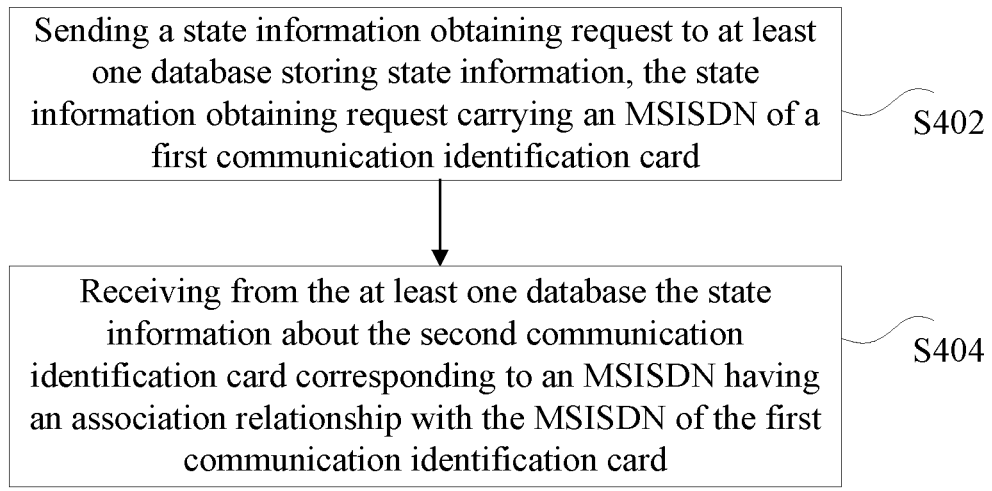
FIG. 4 is yet another example flowchart of a call request processing method according to an embodiment of the disclosure.

Accordingly, the obtaining of state information may be performed based on the MSISDN. The implementation manner is relatively easy, and an association relationship among MSISDNs of several communication identification cards in a multi-mode terminal is required to be stored in the database. For example, if the MSISDN of card A is known, then one or more MSISDNs having an association relationship with the MSISDN of card A can be found in the database, and communication identification cards corresponding to these MSISDNs having an association relationship with the MSISDN of card A are cards located in the same terminal with the card A. By means of this method, current state information about various cards located in the same terminal with the card A can be obtained. In an example implementation, as shown in FIG. 4, obtaining state information about the second communication identification card located in the same terminal with the first communication identification card may include step S402 to S404.

In step S402: a state information obtaining request is sent to at least one database for storing state information, wherein the state information obtaining request carries an MSISDN of the first communication identification card.

In step S404: the state information about the second communication identification card corresponding to an MSISDN having an association relationship with the MSISDN of the first communication identification card is received from the at least one database.

In the embodiments of the disclosure, another method for searching for state information is further provided. In this method, an association relationship may not be stored in the at least one database. Correspondingly, an MSISDN which corresponds to the terminal and is different from the MSISDN of the first communication identification card is found from the at least one database according to the IMIE number of the terminal where card A is located. In an example implementation, after sending a state information obtaining request to a database storing state information, the method further includes: if an MSISDN of a second communication identification card having an association relationship with the MSISDN of the first communication identification card is not found in the database, according to the IMEI number of the terminal carried in the state information obtaining request, searching for an MSISDN which corresponds to the terminal and is different from the MSISDN of the first communication identification card from the database; and receiving from the at least one database the state information about the second communication identification card corresponding to the MSISDN different from the MSISDN of the first communication identification card.

For example, the obtained state information about the second communication identification card may be in a communication state, then it can be seen that the current first communication identification card cannot be connected due to the fact that the second communication identification card is in a communication state. At this time, the call request may be processed according to a pre-determined strategy. In an example embodiment, the pre-determined strategy may include but is not limited to at least one of the following:

1) after the terminal is hung up, sending the call request to the terminal through a network to which the second communication identification card belongs;

2) sending the call request to the terminal through a network to which the second communication identification card belongs in the manner of a short message;

3) sending the call request to the terminal through a network to which the second communication identification card belongs in the manner of a voice message; or 4) transferring the call request to the second communication identification card.

Since each communication identification card sends location information thereabout to a network to which the communication identification card belongs according to a pre-determined frequency, and if a radio frequency transceiving chip corresponding thereto does not work, the location information thereof also cannot be reported. Therefore, if it is found that the reason for not being able to be connected is that the location information thereabout is not reported for a long time, then it can be determined that the communication identification card cannot be connected. At this time, current state information about a communication identification card located in the same terminal therewith can be obtained, and then whether the communication identification card cannot be connected due to the fact that there is another card being in communication in the corresponding terminal thereof is judged. In an example implementation, obtaining state information about a second communication identification card located in a same terminal with a first communication identification card includes: receiving the call request; judging whether an MSC of a network to which the first communication identification card belongs does not receive location information about the first communication identification card reported by the first communication identification card within a pre-defined time; if the MSC does not receive the location information within the pre-defined time, the MSC obtaining state information about a second communication identification card located in a same terminal with the first communication identification card.

Figure 5:
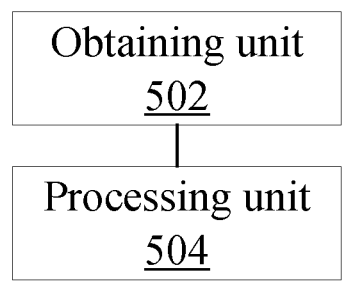
FIG. 5 is an example structure diagram of a call request processing device according to an embodiment of the disclosure.

In the present embodiment, a call request processing device is further provided, and the device is used for realizing the above-mentioned embodiment and example implementations, and which have been described need not be described redundantly. As used in the following, the term "unit" or "module" may realize a combination of software and/or hardware with a pre-determined function. Although the device described in the following embodiments is better realized by software, the implementation thereof through software or a combination of software and software is also possible and contemplated. FIG. 5 is an example structure diagram of a call request processing device according to an embodiment of the disclosure. As shown in FIG. 5, the device includes: an obtaining unit 502 and a processing unit 504, and the structure is described below.

The obtaining unit 502 which is configured to obtain state information about a second communication identification card located in a same terminal with a first communication identification card.

The processing unit 504 is coupled to the obtaining unit 502 and is configured to process a call request according to the state information, wherein the call request is used for calling the first communication identification card.

In an example implementation, the above-mentioned obtaining unit may obtain the state information about the second communication identification card from at least one database storing state information. At least one database which is specially used to store state information is set, and state information about various communication identification cards is stored in the at least one database.

An example embodiment is provided in the disclosure to further explain the disclosure. However, it should be noted that the present example embodiment is only for better description of the disclosure, rather than to limit the disclosure.

With regard to the technical problem of call loss in the related art due to the fact that in the case where one SIM card of a dual-card dual-standby mobile phone is in a communication state, the other SIM card will be in a no service state. The present example embodiment provides a processing method, and the core inventive concept thereof includes establishing one shared database between networks, the shared database being used for store relevant information, such as state information about a dual-card dual-standby phone, International mobile subscriber identification (IMSI) numbers and mobile station international ISDN/PSTN numbers (MSISDNs) of e.g., two SIM cards, etc. In an example embodiment, the database is jointly updated and maintained by networks to which the two SIM cards belong, and state information about the dual-card dual-standby phone is uploaded to the database in real time. When any one of the two cards cannot be paged, the network of the called party can obtain the current state of the dual-card dual-standby phone by querying relevant information stored in the database, thereby realizing state recognition of the dual-card dual-standby phone.

By means of the above-mentioned method, when one SIM card of the dual-card dual-standby phone is in a communication process, if the other SIM card becomes the called party, then a network side of the called SIM card obtains the current state of the dual-card dual-standby phone, and decides the next action according to a service subscribed to by the called SIM card. In an example embodiment, the next action may be but is not limited to at least one of the following: reminding a calling party that the telephone of the called party is in a communication; according the mobile network capabilities of the two parties, selecting to hang up and notifying the called party in the manner of a short message; leaving a message to the called party or waiting to establish a new communication after the called party ends the current communication. In this way, the user experience can be greatly improved. It should be noted that the present example embodiment takes a dual-card dual-standby mobile phone for example to explain; however, the disclosure is not limited thereto, and may also be applied to communication terminals of three-card three-standby or multi-card multi-standby with more modes.

The following further describes the present example embodiment with reference to several specific implementations.

One shared database established between different mobile networks in the present embodiment is referred to as a user state information shared database, and is referred to as a "database" hereinafter for ease of description. The user state information saved in the data includes but is not limited to the following types: in communication, having no service, performing data service, performing fax service, video communication, idle, etc. In an example embodiment, the database may be maintained by mobile switching centres (MSCs) at different network sides, and the newest state of a user of a dual-card dual-standby phone is updated in real time. When the user of the dual-card dual-standby phone is called, the accurate current state of the user can be judged only by querying the newest data in the database. The current state is returned to a network of a calling party, and then the network of the calling party determines the next action according to the service capability of the user.

The database may logically have the following two implementation manners.

1) The database is an independent database, wherein only the state information about the user of the dual-card dual-standby phone is stored therein. All the different networks will upload state information about users of dual-card dual-standby phones thereof to the database. At the same time, all the different networks can obtain the newest state information about the users from the database.

2) The database is divided into several sub-databases, and different mobile networks have their own independent databases and are respectively responsible for their own databases. When the state information about a user is needed, the corresponding mobile network provides the state information to other networks for other network sides to make a further selection.

In an example embodiment, the above-mentioned database can either physically coexist with the existing network devices, such as an MSC, or exist independent of the existing network devices.

Information in the database may be established or updated by using a plurality of mechanisms, which may include but are not limited to one of the following three manners.

1) When an MS (mobile terminal) is powered on and registers to a network, relevant information about the mobile terminal (MS) is reported, wherein an indication code of a dual-card dual-standby phone is added to the reported information. In an example embodiment, the indication code may be added to an MS device type for distinguishing an ordinary single-card mobile phone and a dual-card dual-standby mobile phone. When an MSC receives that dual-card dual-standby information is contained in MS registration information, information, such as an IMEI number, an IMSI number and an MSISDN of the MS, is uploaded to the database. Since information obtained in the way has the timeliness, for example, if the terminal is powered off, information corresponding thereto in the database can be deleted correspondingly. Since a user of a dual-card dual-standby phone may change anytime, if the above-mentioned registration information is permanently effective, the waste of network resources will be caused.

2) A user of a dual-card dual-standby phone actively registers in a network operator, and the operator enters relevant information about the dual-card dual-standby phone in a database through an OSS operation maintenance subsystem, the information being permanent information.

3) Whether a dual-card dual-standby phone reports an MSISDN or an IMSI of the other card to the current registration network may be decided by a user itself. By means of this manner, the privacy right of the user may be effectively protected. However, methods for processing a call are also different corresponding to whether to report the MSISDN or the IMSI of the other card. Further description is made with reference to two specific embodiments.

Embodiment I

Figure 6:
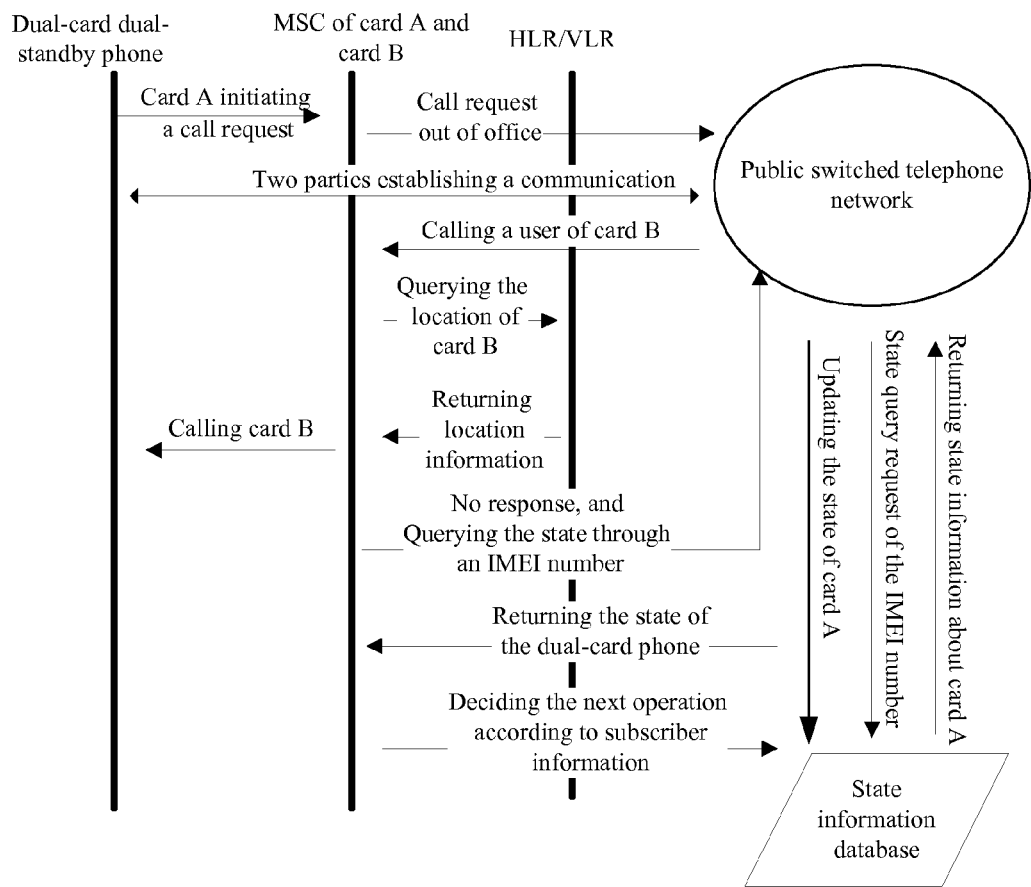
FIG. 6 is an example schematic flowchart of a call request processing method according to embodiment I of the disclosure.

In the present embodiment, the situation that a dual-card dual-standby phone does not report an MSISDN of the other SIM card to a network database is mainly involved; therefore, there is no association between MSISDNs of two SIM cards in the database. As shown in FIG. 6, the following steps S1 to S4 are included.

In step S1: one SIM card (card A) in a dual-card dual-standby phone establishes a communication through a normal call flow, and a network to which the card A belongs sends a data packet containing state information about the card A to a database so as to update the state of the dual-card dual-standby phone. In addition, a radio-frequency circuit corresponding to the other SIM card (card B) does not work at that time, and cannot communicate with a base station (BS), thus being resulted in a no service state.

In step S2: at that time, there is an outside user calling the card B, and after a network side of the B card receives a call request, an MSC at the network side of the B card sends out a request for requesting location information about the card B to an HLR/VLR; location information registered by the card B for the last time is stored in the HLR and is sent to the MSC; and according to the location information, the MSC sends out signalling to a corresponding BSC and requires to page the card B. However, since the radio-frequency circuit corresponding to the card B is in an off state, the paging is unsuccessful, and step S3 is executed. If the card B does not report information to the BSC for a long time, for example, the period of not reporting information exceeds a preset duration, then there is no location for the card B in the HLR/VLR; therefore, the MSC does not page the BSC, and step S3 is executed directly.

In step S3: the MSC of the network of the card B sends a state information request to the database, and the request carries the MSISDN of the card B and the IMEI number of the dual-card phone. After the database receives the state information request, firstly, another MSISDN associated with the MSISDN of the card B is queried in the database, and since the MSISDN of the other card is not stored, the return value is null. Then a second query is performed, and in this query, retrieval is performed based on the IMEI number of the dual-card dual-standby phone, so as to obtain the state information about the card A; and for the present embodiment, the state information about the card A is "in communication". The database returns the state information about the card A together with the IMEI number to the MSC of the network of the card B.

In step S4: after receiving the state information returned by the database, the MSC at the network side of the card B determines the next action according to information in a subscriber server of the card B. In an example embodiment, the next action may be determined according the network capability of the card B and information in the subscriber server of the card B, and the determined action may include but is not limited to one of the following actions: after being hung up, sending same to a user of a dual-card phone through the network of the card A in the manner of a short message, sending same to a user of a dual-card phone through the network of the card A in the manner of a voice message, transferring same to the card A, or the like.

So far, the network side of the card B obtains the real state in which the mobile terminal of the card B is located, and thus the information can be returned to a network of an outside calling party, thereby avoiding the phenomenon of prompting "No Service" in the past, and improving the user experience. In the communication process, a registration flow, an authentication flow, a call establishment flow, an attachment flow, or the like can be conducted by using the processing methods in the prior art.

In the present example implementation, the main features lie in that there is no association between the MSISDNs of the card A and the card B, and it needs to realize the query of the state information through the IMEI number of the dual-card dual-standby phone. The difference between the independent databases or the sub-databases lies in that when a plurality of sub-databases are corresponded thereto, all the sub-databases are required to be traversed so as to determine the most indeed information finally.

Embodiment II

Figure 7:
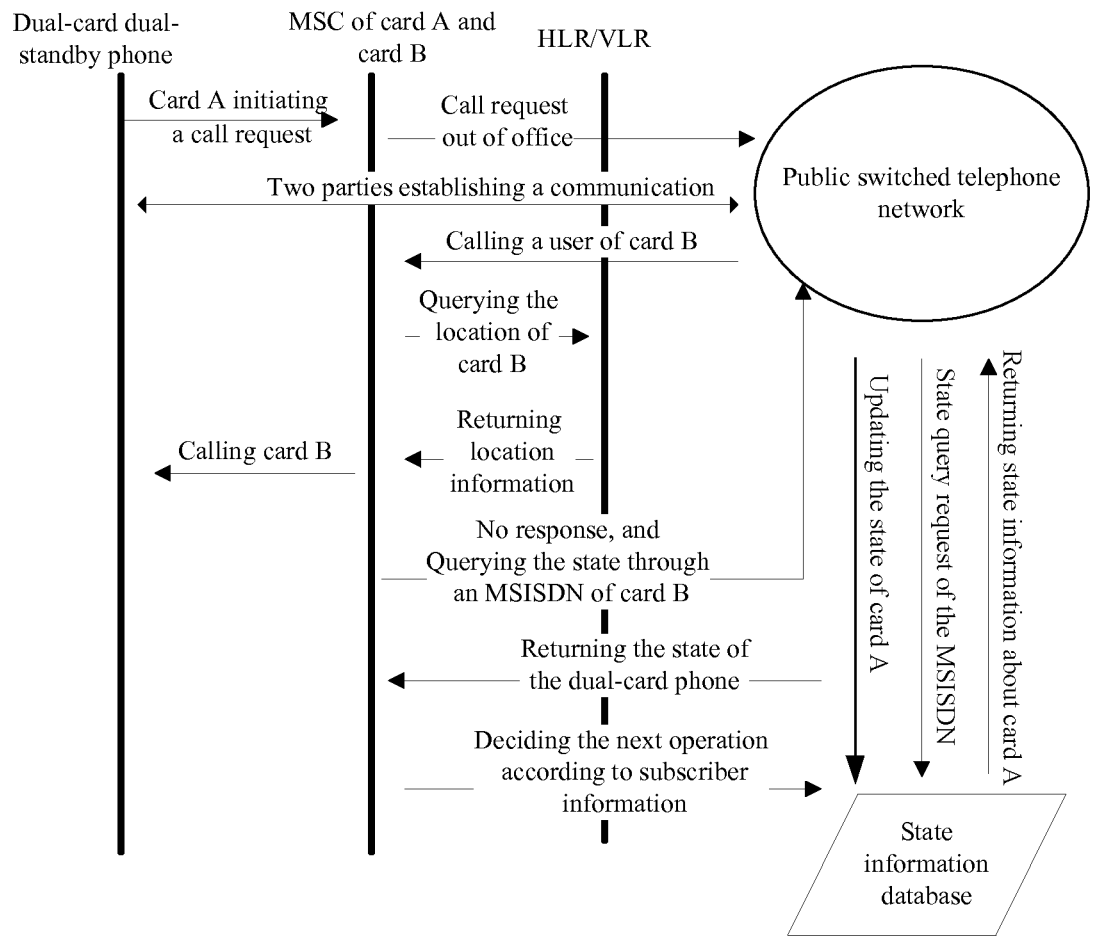
FIG. 7 is an example schematic flowchart of a call request processing method according to embodiment II of the disclosure.

In the present embodiment, the situation that a dual-card dual-standby phone reports an MSISDN of the other SIM card to a network database is mainly involved; therefore, there is an association between MSISDNs of two SIM cards in the database. As shown in FIG. 7, the following steps S1 to S4 are included.

In step S1: one SIM card (card A) in a dual-card dual-standby phone establishes a communication through a normal call flow, and a network to which the card A belongs sends a data packet containing state information about the card A and the card B to a database so as to update the state of the dual-card dual-standby phone. In addition, a radio-frequency circuit corresponding to the other SIM card (card B) does not work at the current time, and cannot communicate with a base station (BS), thus being resulted in a no service state.

In step S2: at that time, there is an outside user calling the card B, and after a network side of the B card receives a call request, an MSC at the network side of the B card sends out a request for requesting location information about the card B to an HLR/VLR; location information registered by the card B for the last time is stored in the HLR and is sent to the MSC; and according to the location information, the MSC sends out signalling to a corresponding BSC and requires to page the card B. However, since the radio-frequency circuit corresponding to the card B is in an off state, the paging is unsuccessful, and step S3 is executed. If the card B does not report information to the BSC for a long time, for example, the period of not reporting information exceeds a preset duration, then there is no location for the card B in the HLR/VLR; therefore, the MSC does not page the BSC, and step S3 is executed directly.

In step S3: the MSC of the network of the card B sends a state information request to the database, and the request carries the MSISDN of the card B, the MSISDN of the card A and the IMEI number of the dual-card phone. After receiving the state information request, the database performs retrieval according to the MSISDN of the card A, and at this time, the state information about the card A will be returned. The database returns the state information about the card A together with the IMEI number to the MSC of the network of the card B so as to determine whether the state information about the card A is "in communication".

In step S4: after receiving the state information returned by the database, the MSC at the network side of the card B notifies the calling party that the user is busy and keeps the line. The next action is determined according to information in a subscriber server of the card B. In an example embodiment, the next action may be determined according the network capability of the card B and information in the subscriber server of the card B, and the determined action may include but is not limited to one of the following actions: after being hung up, sending same to a user of a dual-card phone through the network of the card A in the manner of a short message, sending same to a user of a dual-card phone through the network of the card A in the manner of a voice message, transferring same to the card A, or the like.

By means of the above-mentioned several example implementations, in the case where the current network structure is not changed and the hardware is not upgraded, the technical problem that when one party of a dual-card dual-standby phone is in communication, the other party thereof is in no service is solved.

In another embodiment, a kind of software is further provided, and the software is used for executing the technical solutions described in the above-mentioned embodiments and the example implementations.

In another embodiment, a storage medium is further provided, wherein the storage medium stores the above-mentioned software, and the storage medium includes but is not limited to an optical disk, a floppy disk, a hard disk, erasable programmable memory, etc.

It can be seen from the description above that the disclosure realizes the following technical effects: after a request for accessing a communication identification card in a terminal is received, if the communication identification card cannot be connected normally, the current state of another communication identification card in the terminal can be obtained, and then a call request can be processed according to the current state of said another communication identification card. By virtue of the above-mentioned method, the technical problem that because only one radio frequency transceiving chip is arranged in a dual-mode dual-card phone, if one card is in a communication state, a call to another card is easily lost is effectively solved. By means of the method provided in the present embodiment, indication information about a card in a communication state in the terminal can be returned, thereby reducing call loss.

Apparently, those skilled in the art shall understand that the above modules or steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the disclosure is not restricted to any particular hardware and software combination.

The above description is only example embodiments of the present document and is not intended to limit the disclosure, and the disclosure can have a variety of changes and modifications for ordinary person skilled in the field. Any modification, equivalent replacement, or improvement made within the principle of the disclosure shall all fall within the protection scope as defined in the appended claims of the disclosure.

What is claimed is:

1. A call request processing method, comprising:
   obtaining state information about a second communication identification card located in a same terminal with a first communication identification card; and
   processing a call request according to the state information, wherein the call request is used for calling the first communication identification card;
   wherein processing the call request according to the obtained state information about the second communication identification card comprises: when the obtained state information about the second communication identification card comprises that the second communication identification card is in a communication state, processing the call request according to a pre-determined strategy;
wherein the pre-determined strategy comprises at least one of the following:
after the terminal is hung up, sending the call request to the terminal through a network to which the second communication identification card belongs;
sending the call request to the terminal through a network to which the second communication identification card belongs in a manner of a short message;
sending the call request to the terminal through a network to which the second communication identification card belongs in a manner of a voice message;
transferring the call request to the second communication identification card.

2. The method according to claim 1, wherein obtaining the state information about the second communication identification card located in the same terminal with the first communication identification card comprises:
obtaining the state information about the second communication identification card from at least one database for storing the state information.

3. The method according to claim 2, wherein a plurality of networks share one database used for storing state information.

4. The method according to claim 2, characterized in before the obtaining of the state information about the second communication identification card located in the same terminal with the first communication identification card, the method further comprises:
when the terminal is powered on, the terminal sending registration information to mobile switching centres (MSCs) of a plurality of networks to which a plurality of communication identification cards in the terminal belong, wherein the registration information carries indication information for indicating that the plurality of communication identification cards in the terminal are located in a multi-card terminal; and
in response to the indication information, the MSCs uploading relevant information about the terminal to the at least one database for storing the state information.

5. The method according to claim 4, wherein the relevant information comprises at least one of the following: an International mobile equipment identity (IMEI) number of the terminal, an International mobile subscriber identification (IMSI) number of the terminal, and mobile station ISDN numbers (MSISDNs) of the plurality of communication identification cards in the terminal.

6. The method according to claim 1, wherein obtaining the state information about the second communication identification card located in the same terminal with the first communication identification card comprises:
sending a state information obtaining request to at least one database for storing the state information, wherein the state information obtaining request carries an MSISDN of the first communication identification card; and
receiving from the at least one database the state information about the second communication identification card corresponding to an MSISDN having an association relationship with the MSISDN of the first communication identification card.

7. The method according to claim 6, wherein after the sending of the state information obtaining request to the at least one database for storing the state information, the method further comprises:
if the MSISDN of the second communication identification card having the association relationship with the MSISDN of the first communication identification card is not found in the at least one database, according to an IMEI number of the terminal carried in the state information obtaining request, searching for an MSISDN which corresponds to the terminal and is different from the MSISDN of the first communication identification card from the at least one database; and
receiving from the data base the state information about the second communication identification card corresponding to the MSISDN which is different from the MSISDN of the first communication identification card.

8. The method according to claim 1, wherein obtaining the state information about the second communication identification card located in the same terminal with the first communication identification card comprises:
receiving the call request; and
judging whether an MSC of a network to which the first communication identification card belongs does not receive location information about the first communication identification card reported by the first communication identification card within a pre-defined time;
if the MSC does not receive the location information within the pre-defined time, the MSC obtaining the state information about the second communication identification card located in the same terminal with the first communication identification card.

9. The method according to claim 3, characterized in before the obtaining of the state information about the second communication identification card located in the same terminal with the first communication identification card, the method further comprises:
when the terminal is powered on, the terminal sending registration information to mobile switching centres (MSCs) of a plurality of networks to which a plurality of communication identification cards in the terminal belong, wherein the registration information carries indication information for indicating that the plurality of communication identification cards in the terminal are located in a multi-card terminal; and
in response to the indication information, the MSCs uploading relevant information about the terminal to the at least one database for storing the state information.

10. The method according to claim 9, wherein the relevant information comprises at least one of the following: an International mobile equipment identity (IMEI) number of the terminal, an International mobile subscriber identification (IMSI) number of the terminal, and mobile station ISDN numbers (MSISDNs) of the plurality of communication identification cards in the terminal.

11. The method according to claim 6, wherein obtaining the state information about the second communication identification card located in the same terminal with the first communication identification card comprises:
receiving the call request; and
judging whether an MSC of a network to which the first communication identification card belongs does not receive location information about the first communication identification card reported by the first communication identification card within a pre-defined time;

if the MSC does not receive the location information within the pre-defined time, the MSC obtaining the state information about the second communication identification card located in the same terminal with the first communication identification card.

12. The method according to claim 7, wherein obtaining the state information about the second communication identification card located in the same terminal with the first communication identification card comprises:

receiving the call request; and judging whether an MSC of a network to which the first communication identification card belongs does not receive location information about the first communication identification card reported by the first communication identification card within a pre-defined time;

if the MSC does not receive the location information within the pre-defined time, the MSC obtaining the state information about the second communication identification card located in the same terminal with the first communication identification card.

13. A call request processing device, comprising:

an obtaining unit, which is configured to obtain state information about a second communication identification card located in a same terminal with a first communication identification card; and a processing unit, which is configured to process a call request according to the state information, wherein the call request is used for calling the first communication identification card;

wherein the processing unit, which is further configured to when the obtained state information about the second communication identification card comprises that the second communication identification card is in a communication state, processing the call request according to a pre-determined strategy;

wherein the pre-determined strategy comprises at least one of the following:

after the terminal is hung up, sending the call request to the terminal through a network to which the second communication identification card belongs;

sending the call request to the terminal through a network to which the second communication identification card belongs in a manner of a short message;

sending the call request to the terminal through a network to which the second communication identification card belongs in a manner of a voice message;

transferring the call request to the second communication identification card.

14. The device according to claim 13, wherein the obtaining unit is configured to obtain the state information about the second communication identification card from at least one database for storing the state information.

* * * * *